US011518411B2

(12) United States Patent
Hanawa et al.

(10) Patent No.: US 11,518,411 B2
(45) Date of Patent: Dec. 6, 2022

(54) VEHICLE CONTROLLER DEVICE AND REMOTE VEHICLE CONTROL SYSTEM

(71) Applicant: TOYOTA JIDOSHA KABUSHIKI KAISHA, Toyota (JP)

(72) Inventors: Atsushi Hanawa, Miyoshi (JP); Yasuki Nakagawa, Toyota (JP); Makoto Matsushita, Ichinomiya (JP); Yusuke Yokota, Susono (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 16/884,209

(22) Filed: May 27, 2020

(65) Prior Publication Data

US 2021/0016800 A1    Jan. 21, 2021

(30) Foreign Application Priority Data

Jul. 17, 2019   (JP) .............................. JP2019-132160

(51) Int. Cl.
*B60W 60/00* (2020.01)
*G05D 1/00* (2006.01)
(Continued)

(52) U.S. Cl.
CPC ........ *B60W 60/0025* (2020.02); *B60W 40/08* (2013.01); *B60W 50/14* (2013.01);
(Continued)

(58) Field of Classification Search
None
See application file for complete search history.

(56) References Cited

U.S. PATENT DOCUMENTS 11,079,753 B1 *  8/2021  Roy ..................... G05D 1/0278
11,188,074 B1 * 11/2021  Benavidez ........... G05D 1/0022
(Continued)

FOREIGN PATENT DOCUMENTS

EP          3301530 A1 *  4/2018  ............. G08G 1/164
JP       H11-328593 A      11/1999
(Continued)

*Primary Examiner* — James J Lee
*Assistant Examiner* — Tawri M Matsushige
(74) *Attorney, Agent, or Firm* — Oliff PLC

(57) ABSTRACT

A vehicle controller device includes a first processor. The first processor is configured to acquire biometric information of an occupant, in cases in which the compromised state is determined to have arisen, to communicate check-up information to check the well-being of the occupant using a report device provided inside the vehicle, to receive a response from the occupant whose well-being is being checked, to notify switchover information to an operation device in order to switch the vehicle from manual driving to remote driving in which the vehicle travels based on operation information in cases in which the response has not been received, and to perform the remote driving in cases in which the switchover information has been received by the operation device and operation-ready information indicating that the remote driving is possible has subsequently been received from the operation device.

4 Claims, 7 Drawing Sheets

(51) Int. Cl.
*B60W 40/08* (2012.01)
*B60W 50/14* (2020.01)
*G01C 21/34* (2006.01)

(52) U.S. Cl.
CPC ..... *B60W 60/0053* (2020.02); *G01C 21/3407* (2013.01); *G05D 1/0011* (2013.01); *B60W 2540/221* (2020.02)

(56) References Cited

U.S. PATENT DOCUMENTS

| | | | |
|---|---|---|---|
| 2016/0303969 A1* | 10/2016 | Akula | G16Z 99/00 |
| 2018/0095457 A1* | 4/2018 | Lee | G08G 1/09623 |
| 2019/0163176 A1* | 5/2019 | Wang | G05D 1/0038 |
| 2019/0204830 A1* | 7/2019 | Ogura | G05D 1/0011 |
| 2019/0391581 A1* | 12/2019 | Vardaro | A61B 5/18 |
| 2020/0047773 A1 | 2/2020 | Akaba et al. | |
| 2020/0282980 A1* | 9/2020 | Kinoshita | B60W 40/04 |
| 2020/0283007 A1* | 9/2020 | Choi | G05D 1/0022 |

FOREIGN PATENT DOCUMENTS

| | | |
|---|---|---|
| JP | 2006-164147 A | 6/2006 |
| JP | 2018-077649 A | 5/2018 |
| JP | 2019-070877 A | 5/2019 |
| WO | 2018/087828 A1 | 5/2018 |

* cited by examiner

VEHICLE CONTROLLER DEVICE AND REMOTE VEHICLE CONTROL SYSTEM

CROSS-REFERENCE TO RELATED APPLICATION

This application is based on and claims priority under 35 USC 119 from Japanese Patent Application No. 2019-132160 filed on Jul. 17, 2019, the disclosure of which is incorporated by reference herein.

BACKGROUND

Technical Field

The present disclosure relates to a vehicle controller device and a vehicle control system that are capable of both autonomous driving and remote driving.

Related Art

Japanese Patent Application Laid-Open (JPA) No. 2018-077649 discloses a vehicle that is capable of traveling in driving states including manual driving operated by a vehicle occupant, autonomous driving in which travel of the vehicle is self-driven, and remote driving performed by a remote operator operating a remote operation station.

In vehicles capable of both autonomous driving and remote driving, if driving by operation by the occupant is determined to be compromised, for example due to the occupant suddenly falling ill, danger can be avoided by switching to remote driving.

In order to switch to remote driving in an appropriate manner, the switch to remote driving is preferably performed after checking the decision making ability of the occupant.

SUMMARY

The present disclosure is to provide a vehicle controller device and a vehicle control system capable of switching a vehicle to remote driving after checking occupant decision making ability.

A vehicle controller device according to a first aspect of the present disclosure includes a communication section that is configured to receive operation information to operate a vehicle from an operation device disposed externally to the vehicle and operated by a remote operator, an acquisition section configured to acquire peripheral information regarding a periphery of the vehicle from a peripheral information detection section, a travel plan generation section configured to generate a travel plan for the vehicle based on the peripheral information, a biometric information acquisition section configured to acquire biometric information of an occupant, a state determination section configured to, based on the biometric information acquired by the biometric information acquisition section, determine whether or not a compromised state has arisen in which manual driving by operation by the occupant is predicted to become compromised, a report section configured to, in a case in which the compromised state has been determined to have arisen by the state determination section, communicate check-up information which is for checking the well-being of the occupant, using a first report device provided inside the vehicle, a reception section configured to receive a response from the occupant whose well-being is being checked, a notification section configured to notify switchover information to the operation device in order to switch the vehicle from the manual driving to remote driving in which the vehicle travels based on the operation information in a case in which a response from the occupant has not been received by the reception section, and a travel control section configured to control autonomous driving in which the vehicle travels based on the travel plan generated by the travel plan generation section and control the remote driving, and to perform the remote driving in cases in which the switchover information has been received by the operation device and operation-ready information indicating that the remote driving is possible has subsequently been received from the operation device.

The vehicle controller device according to the first aspect of the present disclosure is capable of executing autonomous driving, this being self-driven travel, and remote driving by the operation device. In cases in which manual driving of the vehicle is predicted to become compromised based on the biometric information, the check-up information used to check the well-being of the occupant is reported using the report device provided inside the vehicle. In cases in which no response is received from the occupant whose well-being is being checked, the vehicle controller device notifies the switchover information to the operation device in order to switch over to remote driving. In cases in which the switchover information has been received by the operation device and the operation-ready information indicating that the remote driving is possible has subsequently been received from the operation device, the vehicle controller device performs the remote driving. In cases in which a response to the check-up information is received by a reception section, the decision making ability of the occupant can be confirmed, namely that a switch to remote driving is not necessary can be confirmed. On the other hand, in cases in which a response is not received by the reception section, it is possible to confirm a lack of occupant decision making ability, namely that a switch to remote driving is necessary. This enables the vehicle to be switched to remote driving after confirming a lack of occupant decision making ability as a result.

A vehicle controller device according to a second aspect of the present disclosure is the configuration of the first aspect, wherein the travel control section is configured to switch from the manual driving to the autonomous driving prior to the operation-ready information being received in a case in which the occupant has been determined to be in the compromised state by the state determination section.

In the vehicle controller device according to the second aspect of the present disclosure, after notifying the switchover information to switch to remote driving to the operation device, the manual driving is switched to the autonomous driving until a remote operator has been secured. The vehicle can thus be made to travel safely by switching to autonomous driving as an alternative in cases in which an immediate switch to remote driving cannot be performed when an abnormal state of an occupant has arisen.

A vehicle controller device according to a third aspect of the present disclosure is the configuration of the first aspect or the second aspect, wherein the notification section is configured to notify information relating to the compromised state to the operation device in cases in which the occupant has been determined to be in the compromised state by the state determination section, and the report section is configured to report the check-up information by outputting audio information received from the operation device that has received the information relating to the compromised state, by outputting audio information.

In the vehicle controller device according to the third aspect of the present disclosure, when the occupant has been determined to be in the compromised state, information relating to the compromised state is notified to the operation device. The audio information received from the operation device that has received the information relating to the compromised state is reported by being output using the report device in order to check the well-being of the occupant. The remote operator operating the operation device is thus able to check the well-being of the occupant, and is able to switch smoothly to remote driving. The remote operator is also able to prepare for remote driving at an early stage A vehicle control system according to a fourth aspect of the present disclosure includes the vehicle controller device of any one of the first aspect to the third aspect, and a remote controller device configured such that in cases in which information relating to the compromised state has been received, a first report device provided to the operation device reports information relating to the compromised state.

In the vehicle control system according to the fourth aspect of the present disclosure, the remote controller device is provided to the operation device operated by the remote operator. When information indicating that the vehicle occupant is in the compromised state has been received, the remote controller device reports information relating to the compromised state using the first report device. For example, this enables a report to be made to the remote operator that the occupant is in the compromised state. The remote operator is able to swiftly respond to an emergency as a result.

The present disclosure is capable of switching a vehicle to remote driving after checking occupant decision making ability.

BRIEF DESCRIPTION I/F THE DRAWINGS

Exemplary embodiments of the present disclosure will be described in detail based on the following figures, wherein.

DETAILED DESCRIPTION

Figure 1:
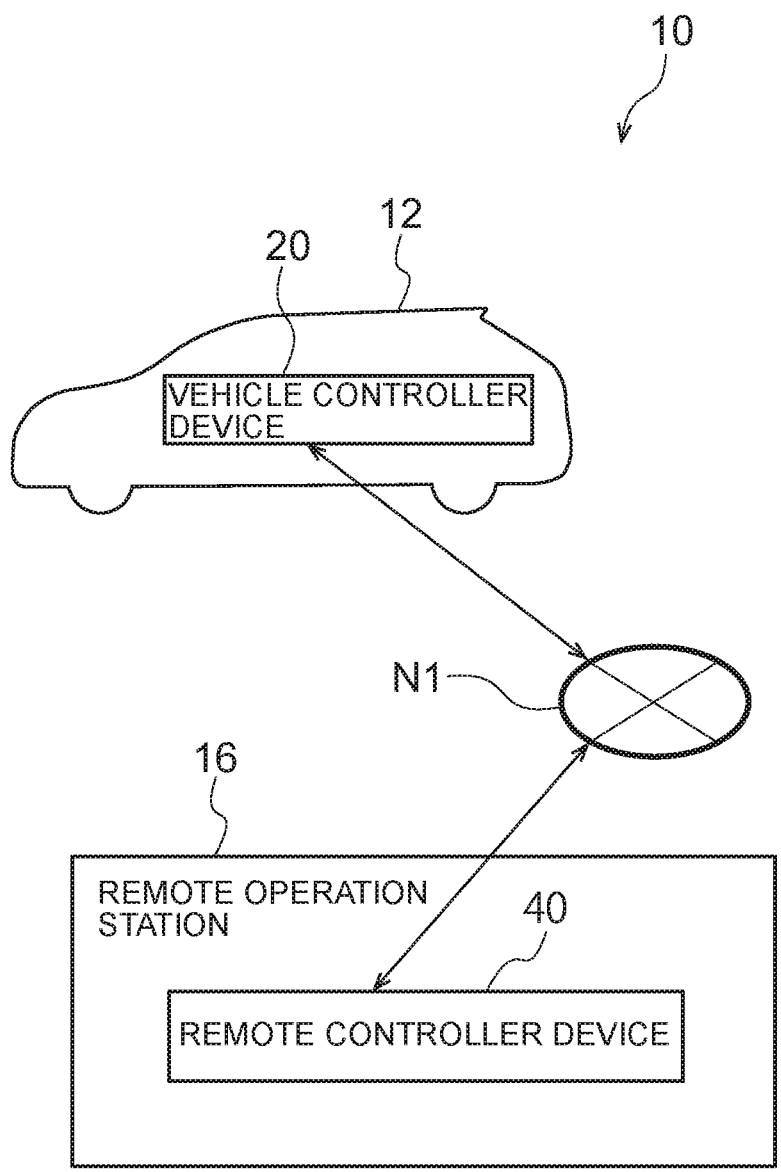
FIG. 1 is a diagram illustrating schematic configuration of a vehicle control system according to a first exemplary embodiment.

FIG. 1 is a block diagram illustrating schematic configuration of a vehicle control system 10 according to a first exemplary embodiment.

Outline

As illustrated in FIG. 1, the vehicle control system 10 according to the first exemplary embodiment is configured including an autonomous driving-enabled vehicle 12 and a remote operation station 16 serving as an operation device.

The vehicle 12 of the present exemplary embodiment includes a vehicle controller device 20, and the remote operation station 16 includes a remote controller device 40. In the vehicle control system 10, the vehicle controller device 20 of the vehicle 12 and the remote controller device 40 of the remote operation station 16 are connected to each other through a network N1.

The vehicle 12 is configured so as to be capable of executing autonomous driving in which self-driving is performed by the vehicle controller device 20 based on a pre-generated travel plan, remote driving based on operation of the remote operation station 16 by a remote driver, and manual driving based on operation by an occupant of the vehicle 12 (namely, a driver).

Autonomous Driving-Enabled Vehicle

Figure 2:
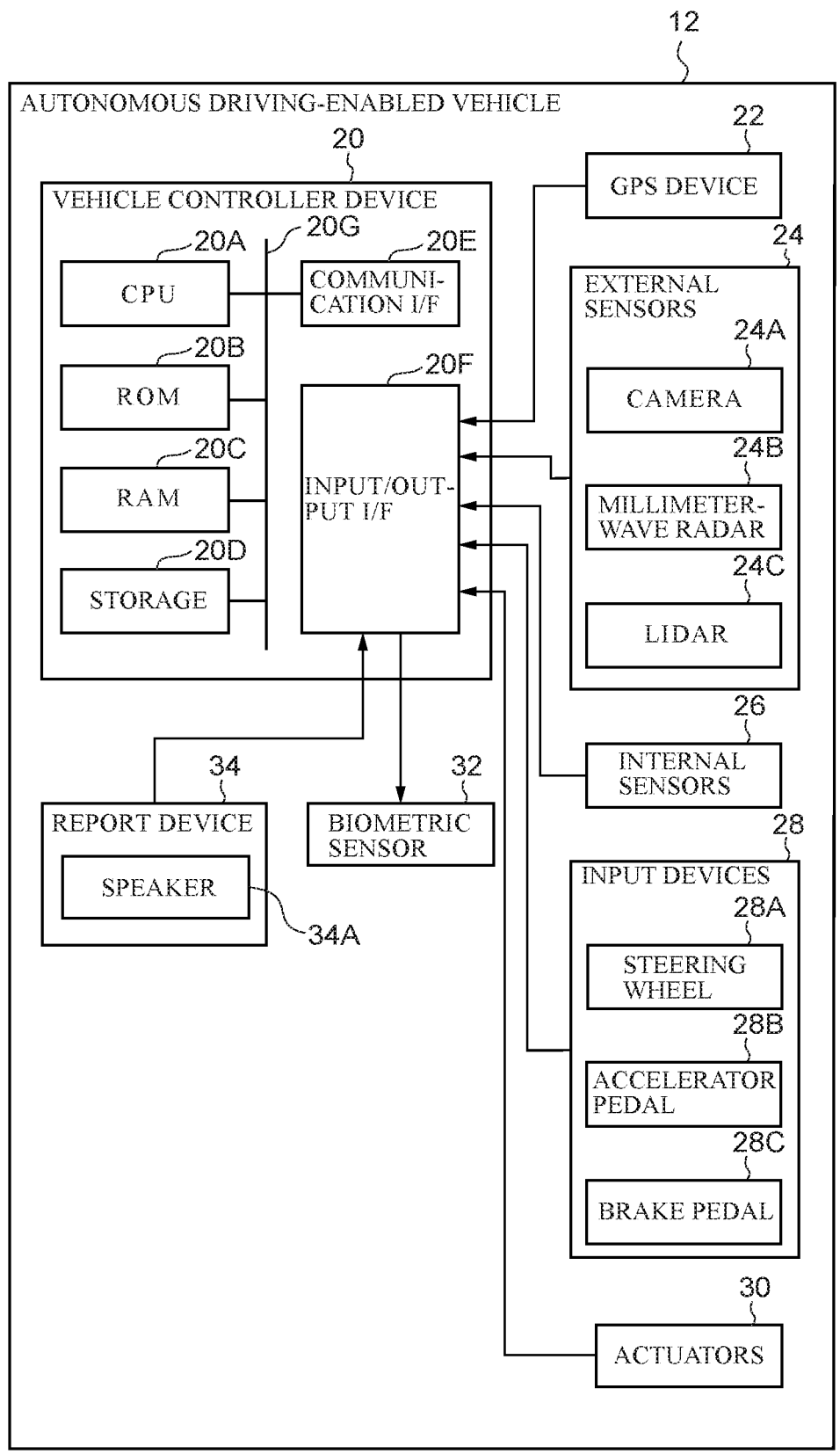
FIG. 2 is a block diagram illustrating hardware configuration of a vehicle in the first exemplary embodiment.

FIG. 2 is a block diagram illustrating hardware configuration of equipment installed in the autonomous driving-enabled vehicle 12 of the present exemplary embodiment. In addition to the vehicle controller device 20 described above, the vehicle 12 includes a global positioning system (GPS) device 22, external sensors 24, internal sensors 26, input devices 28, actuators 30, biometric sensors 32, and a report device 34.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G The CPU 20A is an example of a first processor, and the RAM 20C is an example of first memory.

Figure 3:
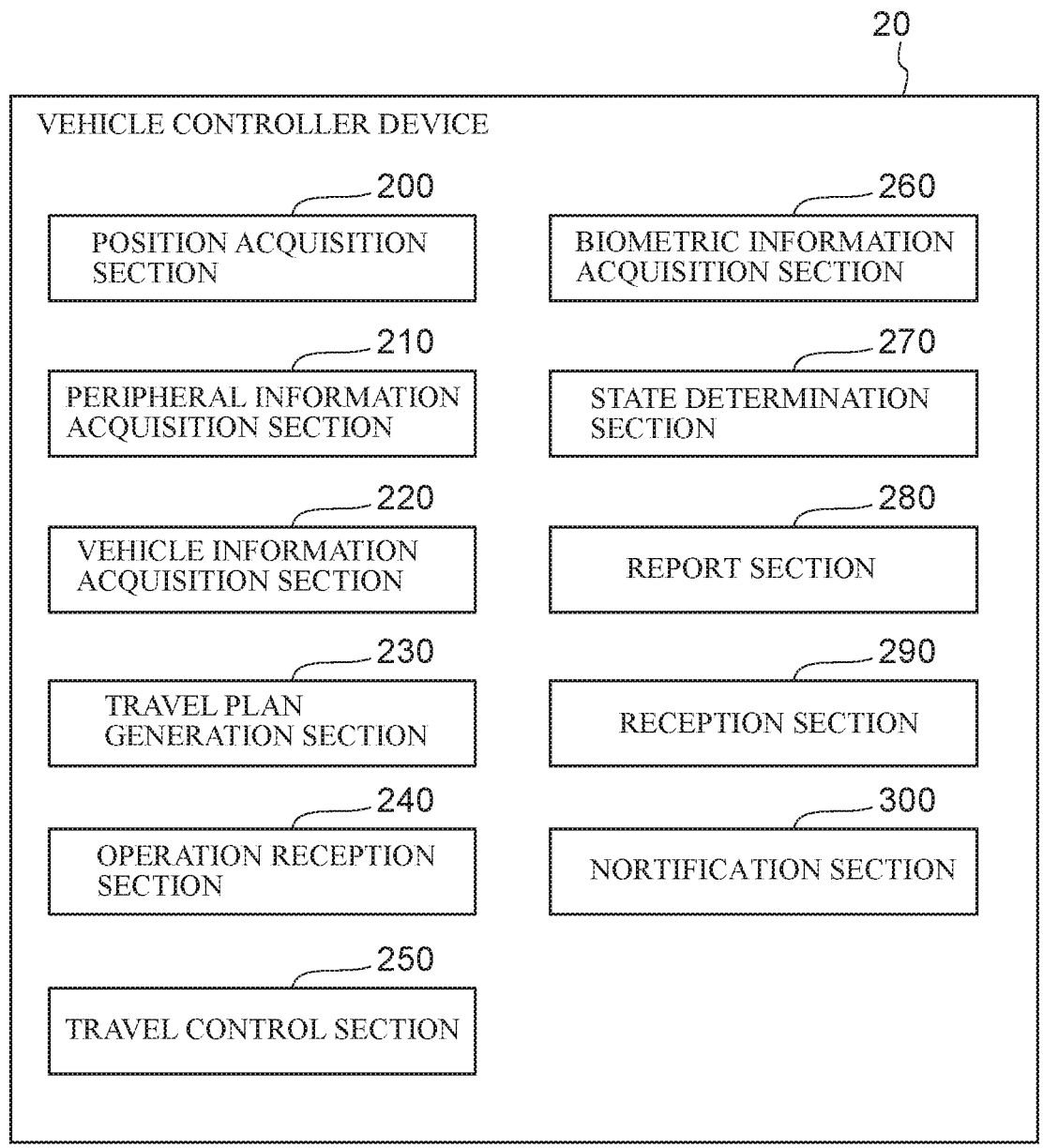
FIG. 3 is a block diagram illustrating an example of functional configuration of a vehicle controller device in the first exemplary embodiment.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. When the CPU 20A executes the execution program, the vehicle controller device 20 functions as a position acquisition section 200, a peripheral information acquisition section 210, a vehicle information acquisition section 220, a travel plan generation section 230, an operation reception section 240, a travel control section 250, a biometric information acquisition section 260, a state determination section 270, a report section 280, a reception section 290, and a notification section 300, as illustrated in FIG. 3.

The ROM 20B illustrated in FIG. 2 stores various programs and various data. The RAM 20C serves as a workspace to temporarily store the programs or data.

The storage 20D serves as a storage section, is configured by a hard disk drive (HDD) or a solid state drive (SSD), and stores various programs including an operating system, as well as various data. Information relating to a compromised state, described later, and biometric information are also stored in an associated state in the storage 20D.

The communication I/F 20E serves as a communication section, and includes an interface for connecting to the network N1 in order to communicate with other vehicle controller devices 20, the remote controller device 40, a non-illustrated information server, and the like. A communication protocol such as Long Term Evolution (LTE) or Wi-Fi (registered trademark) is employed as the interface.

The communication I/F 20E of the present exemplary embodiment transmits an image captured by a camera 24A to the remote operation station 16 that is external to the vehicle 12, and receives remote operation information, this being operation information to operate the vehicle 12, from the remote operation station 16 through the network N1. Note that the communication I/F 20E may also receive weather information, earthquake information, and traffic information regarding traffic jams, accidents, roadworks, and so on from an external information server through the network N1.

The input/output I/F 20F is an interface for communicating with the various devices installed in the vehicle 12. The vehicle controller device 20 of the present exemplary embodiment is connected to the GPS device 22, the external sensors 24, the internal sensors 26, the input devices 28, the actuators 30, the biometric sensors 32, and the report device 34 through the input/output I/F 20F. Note that the GPS device 22, the external sensors 24, the internal sensors 26, the input devices 28, the actuators 30, the biometric sensors 32, and the report device 34 may be directly connected to the bus 20G.

The GPS device 22 is a device for measuring the current position of the vehicle 12. The GPS device 22 includes an antenna (not illustrated in the drawings) to receive signals from GPS satellites.

The external sensors 24 serve as a peripheral information detection section, and are a group of sensors that detect peripheral information regarding the surroundings of the vehicle 12. The external sensors 24 include the camera 24A that images a predetermined range, millimeter-wave radar 24B that transmits scanning waves over a predetermined range and receives the reflected waves, and laser imaging detection and ranging (LIDAR) 24C that scans a predetermined range.

The internal sensors 26 are a group of sensors that detect travel states of the vehicle 12. The internal sensors 26 include at least one out of a vehicle speed sensor, an acceleration sensor, and a yaw rate sensor.

The input devices 28 are a group of switches operated by the occupant on board the vehicle 12. The input devices 28 include a steering wheel 28A serving as a switch to steer the steered wheels of the vehicle 12, an accelerator pedal 28B serving as a switch to cause the vehicle 12 to accelerate, and a brake pedal 28C serving as a switch to cause the vehicle 12 to decelerate.

The actuators 30 include a steering wheel actuator to drive the steered wheels of the vehicle 12, an accelerator actuator to control acceleration of the vehicle 12, and a brake actuator to control deceleration of the vehicle 12.

The biometric sensors 32 include various sensors that detect information in order to infer biometric information, described later, of the occupant of the vehicle. As an example, the biometric sensors 32 include at least one out of an on-board camera that images the head of the occupant, a thermographic camera that detects the body temperature of the occupant, a sound pick-up microphone that picks up sounds generated inside the vehicle cabin, a body pressure sensor that detects load from a seated occupant against a seat, a webbing sensor that detects a webbing pull-out amount, and various sensors that detect vital signs of the occupant.

The report device 34 is an output interface provided inside the vehicle in order to communicate check-up information to the occupant in order to perform a well-being check. The report device 34 of the present exemplary embodiment is configured by a speaker 34A provided inside the vehicle.

Note that there is no limitation thereto, and a report device may be configured by an on-board display light or display instead of, or in addition to, the speaker 34A.

FIG. 3 is a block diagram illustrating an example of functional configuration of the vehicle controller device 20. As illustrated in FIG. 3, the vehicle controller device 20 includes the position acquisition section 200, the peripheral information acquisition section 210, the vehicle information acquisition section 220, the travel plan generation section 230, the operation reception section 240, the travel control section 250, the biometric information acquisition section 260, the state determination section 270, the report section 280, the reception section 290, and the notification section 300. Each of these functional configurations is implemented by the CPU 20A reading the execution program stored in the ROM 20B, and executing this program.

The position acquisition section 200 includes functionality to acquire the current position of the vehicle 12. The position acquisition section 200 acquires position information from the GPS device 22 through the input/output I/F 20F.

The peripheral information acquisition section 210 serves as an acquisition section, and includes functionality to acquire peripheral information regarding the periphery of the vehicle 12. The peripheral information acquisition section 210 acquires peripheral information regarding the vehicle 12 from the external sensors 24 through the input/output I/F 20F. The "peripheral information" includes not only information regarding vehicles and pedestrians in the surroundings of the vehicle 12, but also regarding the weather, brightness, road width, obstacles, and so on.

The vehicle information acquisition section 220 includes functionality to acquire vehicle information such as the vehicle speed, acceleration, yaw rate, and so on of the vehicle 12. The vehicle information acquisition section 220 acquires the vehicle information regarding the vehicle 12 from the internal sensors 26 through the input/output I/F 20F.

The travel plan generation section 230 includes functionality to generate a travel plan to cause the vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the vehicle 12, the speed of the vehicle 12, and so on.

The operation reception section 240 includes functionality to receive signals output from the various input devices 28 when manual driving is being performed based on operation by the occupant of the vehicle 12. The operation reception section 240 also generates vehicle operation information, this being operation information to control the actuators 30, based on signals received from the various input devices 28.

The travel control section 250 includes functionality to control autonomous driving based on the travel plan generated by the travel plan generation section 230, remote driving based on the remote operation information received from the remote operation station 16, and manual driving based on the vehicle operation information received from the operation reception section 240.

The biometric information acquisition section 260 includes functionality to acquire the biometric information of the occupant. The biometric information acquisition section 260 acquires the biometric information of the occupant from the biometric sensors 32 and the input devices 28 through the input/output I/F 20F. Note that the biometric information acquirable from the biometric sensors 32 includes the gaze direction, facial position, expression, posture, breathing sound, body temperature, pulse, and blood pressure of the occupant. The biometric information acquirable from the input devices 28 includes steering force applied to the steering wheel 28A and pedal depression force applied to the accelerator pedal 28B and the brake pedal 28C. The biometric information acquisition section 260 acquires at least one out of these biometric information types.

The state determination section 270 determines a compromised state, in which manual driving by operation by the occupant is predicted to become compromised, based on the biometric information acquired by the biometric information acquisition section 260. Determining the compromised state based on the biometric information is for example performed by setting threshold values for parameters of the various biometric information described above. Namely, the state determination section 270 determines the occupant to be in a compromised state based on the various biometric information when a detected value equal to or greater than a threshold value for the compromised state has been detected for a predetermined determination period or longer.

The report section 280 includes functionality to communicate check-up information using the report device 34 in order to check the well-being of the occupant in cases in which the occupant has been determined to be in the compromised state based on the information acquired from the state determination section 270. Specifically, the report section 280 outputs audio information, serving as check-up information received from the remote operation station 16 through the communication I/F 20E, through the speaker 34A.

The reception section 290 includes functionality to receive a response from the occupant to the check-up information output using the report device 34. As an example, the response may be configured by response-operation information input through a non-illustrated operation section provided inside the vehicle within a predetermined determination period following output of the check-up information by the report device 34. Alternatively, the response may be configured by audio information uttered by the occupant into a non-illustrated sound pick-up microphone provided inside the vehicle within a predetermined determination period following output of the check-up information by the report device 34. Alternatively, the response may be information transmitted from the remote operation station 16 by operation by a remote driver in cases in which the remote driver has judged the occupant to be capable of responding based on information monitored at the remote operation station 16.

The notification section 300 includes functionality to notify information relating to the compromised state to the remote operation station 16 through the communication I/F 20E. Specifically, in cases in which the state determination section 270 has determined the occupant to be in a compromised state, the notification section 300 notifies information relating to the compromised state to the remote operation station 16. Moreover, in cases in which a response from the occupant has not been received by the reception section 290, the notification section 300 notifies switchover information to the remote operation station 16 in order to switch the vehicle 12 to remote driving.

Remote Operation Station

Figure 4:
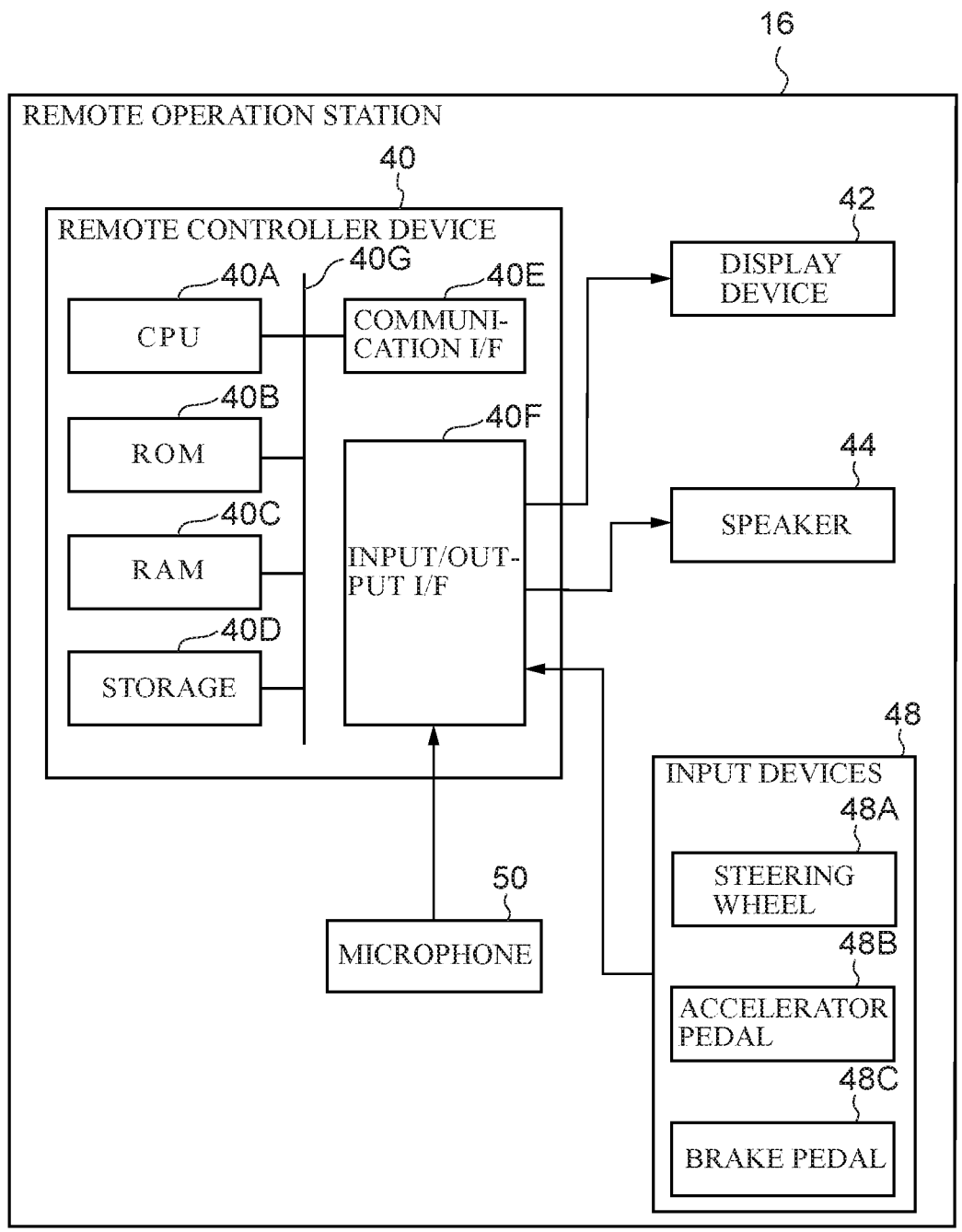
FIG. 4 is a block diagram illustrating hardware configuration of a remote operation station in the first exemplary embodiment.

FIG. 4 is a block diagram illustrating hardware configuration of equipment installed in the remote operation station 16 of the present exemplary embodiment. In addition to the remote controller device 40 previously described, the remote operation station 16 also includes a display device 42, a speaker 44, and input devices 48.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described. The CPU 40A is an example of a second processor, and the RAM 40C is an example of second memory.

Figure 5:
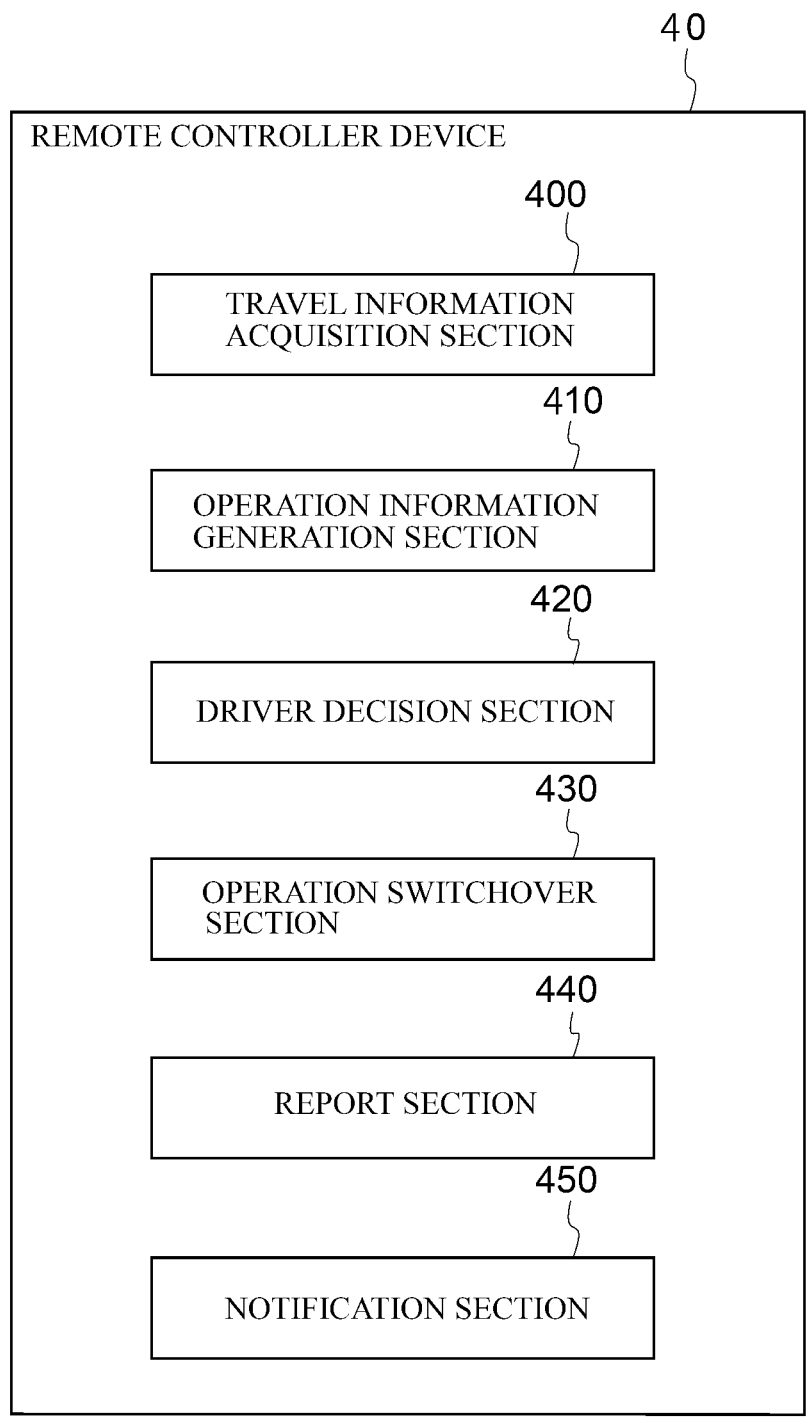
FIG. 5 is a block diagram illustrating an example of functional configuration of a remote controller device in the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, a driver decision section 420, an operation switchover section 430, and a report section 440 as illustrated in FIG. 5.

The display device 42, the speaker 44, the input devices 48, and a microphone 50 are connected to the remote controller device 40 of the present exemplary embodiment through the input/output I/F 40F. Note that the display device 42, the speaker 44, the input devices 48, and the microphone 50 may be directly connected to the bus 40G.

The display device 42 is a liquid crystal monitor for displaying an image captured by the camera 24A of the vehicle 12 and various information relating to the vehicle 12.

The speaker 44 is a speaker for replaying audio recorded by a microphone (not illustrated in the drawings) attached to the camera 24A of the vehicle 12 together with the captured image. In cases in which determination that the occupant is in an abnormal state is made in the vehicle 12, information relating to the compromised state notified by the vehicle 12 is output as audio information through the speaker 44, serving as another report device. This audio information may be an alarm or a message advising of an emergency.

The input devices 48 are controllers to be operated by the remote driver serving as a remote operator using the remote operation station 16. The input devices 48 include a steering wheel 48A serving as a switch to steer the steered wheels of the vehicle 12, an accelerator pedal 48B serving as a switch to cause the vehicle 12 to accelerate, and a brake pedal 48C serving as a switch to cause the vehicle 12 to decelerate. Note that the implementation of the respective input devices 48 is not limited thereto. For example, a lever switch may be provided instead of the steering wheel 48A. As another example, push button switches or lever switches may be provided instead of the pedal switches of the accelerator pedal 48B or the brake pedal 48C.

The microphone 50 is an audio input device that inputs audio uttered by the remote driver to the remote operation station 16 through the input/output I/F 40F.

FIG. 5 is a block diagram illustrating an example of functional configuration of the remote controller device 40. As illustrated in FIG. 5, the remote controller device 40 includes the travel information acquisition section 400, the operation information generation section 410, the driver decision section 420, the operation switchover section 430, the report section 440, and a notification section 450.

The travel information acquisition section 400 includes functionality to acquire audio as well as the images captured by the camera 24A and transmitted by the vehicle controller device 20, and also acquire vehicle information such as the vehicle speed. The acquired captured images and vehicle information are displayed on the display device 42, and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The driver decision section 420 includes functionality to decide on a remote driver to operate the remote operation station 16. For example, in cases in which plural remote drivers are available, the driver decision section 420 decides on one remote driver to be the remote driver to perform operation.

The operation switchover section 430 includes functionality to switch the vehicle controller device 20 to remote driving. When the remote driver who is to perform remote driving operates a non-illustrated operation section of the remote operation station 16, a switchover signal serving as operation-ready information is output to the vehicle controller device 20. For example, when switchover information relating to switching to remote driving has already been received from the vehicle controller device 20 of the vehicle 12, the operation switchover section 430 outputs a switchover signal to the vehicle controller device 20, and the vehicle 12 is thereby switched from autonomous driving or manual driving to remote driving.

The report section 440 includes functionality to report to the remote driver that the occupant of the vehicle 12 is in the compromised state. Specifically, in cases in which information relating to the compromised state transmitted from the vehicle 12 has been received through the communication I/F 40E, the report section 440 uses the speaker 44 to output audio information relating to the compromised state.

The notification section 450 includes functionality to notify check-up information to check the well-being of the occupant of the vehicle 12 to the vehicle controller device 20 through the communication I/F 40E. Specifically, when information relating to the compromised state transmitted by the vehicle 12 has been received, the notification section 450 notifies check-up information input to the remote operation station 16 by operation by the remote driver to the vehicle controller device 20. The check-up information may be verbal audio information uttered into the microphone 50 by the remote driver, or may be audio information such as an alarm sound or a verbal message pre-stored in the remote operation station 16.

Control Flow

Figure 6:
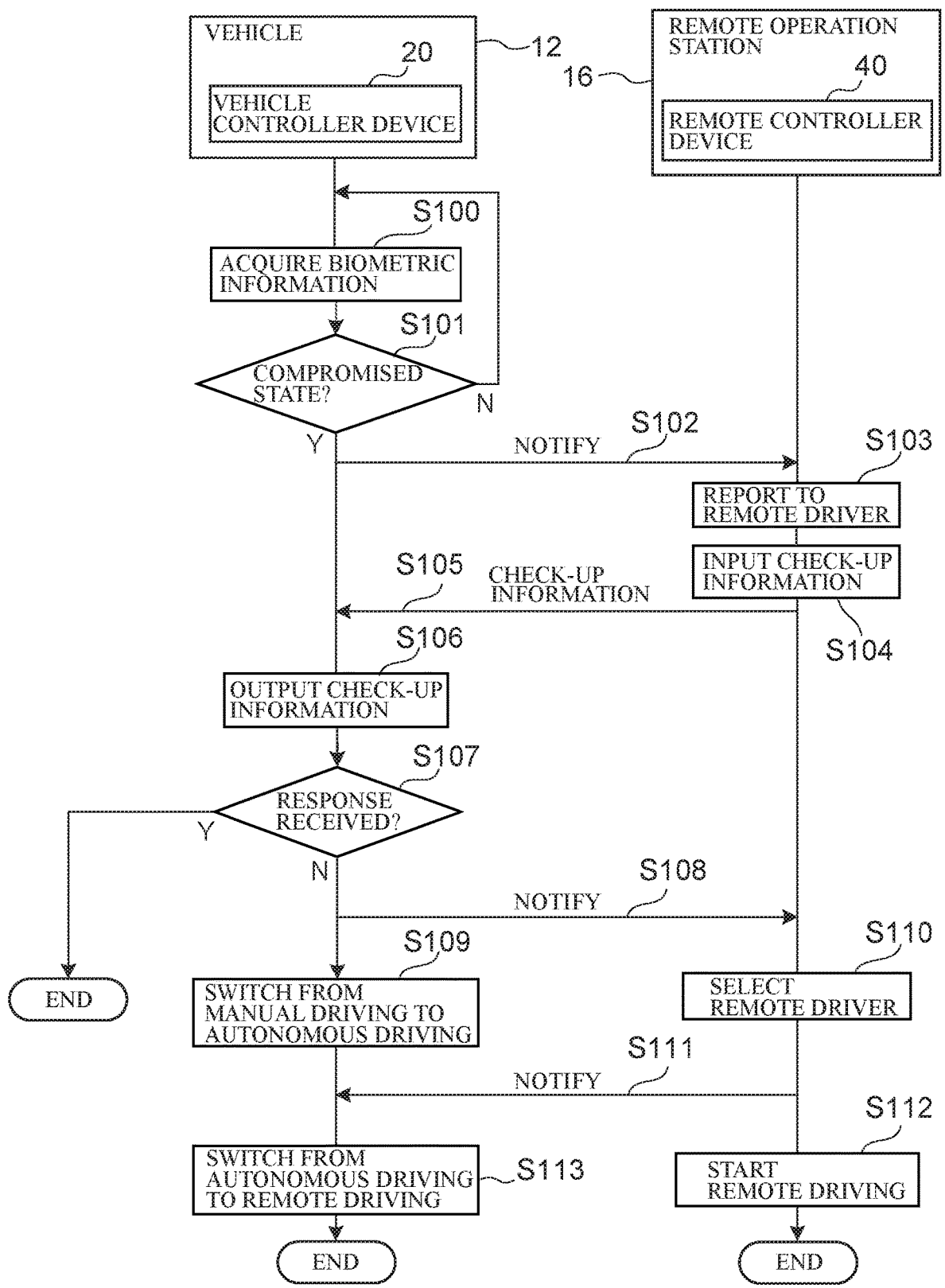
FIG. 6 is a sequence diagram explaining a flow of processing between respective devices in the first exemplary embodiment.

FIG. 6 is a sequence diagram to explain a flow of processing between the respective devices in the vehicle control system 10 of the present exemplary embodiment when the occupant is determined to be in the compromised state and driving of the vehicle 12 is switched to remote driving.

At step S100 in FIG. 6, the CPU 20A of the vehicle 12 that is being manually driven acquires biometric information through the input devices 28 and the biometric sensors 32.

At step S101, the CPU 20A of the vehicle 12 determines whether or not the occupant is in the compromised state based on the acquired biometric information. In cases in which the occupant is determined to be in the compromised state, processing proceeds to step S102. In cases in which the occupant is determined not to be in the compromised state, processing returns to step S100.

At step S102, the CPU 20A of the vehicle 12 notifies to the remote operation station 16 that the occupant is in the compromised state.

At step S103, the CPU 40A of the remote operation station 16 reported to the remote driver that the occupant is in the compromised state. Specifically, the CPU 40A outputs audio information relating to the compromised state through the speaker 44 as a report to an operator at the remote operation station 16. Note that the operator receiving the report relating to the compromised state may be a different person to the remote driver actually tasked with remote driving of the vehicle 12. For example, such an operator may be an operator responsible for selecting one remote driver from out of plural remote drivers to take over driving of the vehicle 12.

At step S104, the CPU 40A of the remote operation station 16 inputs the remote operation station 16 with check-up information input by the remote driver in order to check the well-being of the occupant.

At step S105, the CPU 40A of the remote operation station 16 notifies the check-up information to the vehicle controller device 20.

At step S106, the CPU 20A of the vehicle 12 outputs the check-up information received from the remote operation station 16 through the speaker 34A of the report device 34. The CPU 20A thus starts an occupant well-being check-up.

At step S107, the CPU 20A of the vehicle 12 determines whether or not the occupant has responded to the check-up information output inside the vehicle. In cases in which a response is determined to have been made, the processing is ended. In cases in which a response is determined not to have been made, processing proceeds to step S108.

At step S108, the CPU 20A of the vehicle 12 notifies to the remote operation station 16 switchover information for switching the vehicle 12 over to remote driving.

At step S109, the CPU 20A of the vehicle 12 switches the vehicle 12 from manual driving to autonomous driving.

At step S110, the CPU 40A of the remote operation station 16 selects one remote driver capable of remotely driving the vehicle 12.

At step S111, the CPU 40A of the remote operation station 16 notifies operation-ready information to the vehicle 12 to indicate that the vehicle 12 can be remotely operated.

At step S112, the CPU 40A transmits operation information based on operation by the remote driver to the vehicle controller device 20 to start remote operation, and ends the current processing.

At step S113, the CPU 20A of the vehicle 12 receives the operation information transmitted from the remote operation station 16, switches the vehicle 12 from autonomous driving to remote driving, and ends the current processing.

Operation and Advantageous Effects

The vehicle controller device 20 of the present exemplary embodiment is capable of executing autonomous driving, this being self-driven travel, and remote driving by an operation device. In cases in which manual driving of the vehicle is predicted to become compromised based on the biometric information of the occupant, the vehicle controller device 20 reports check-up information using the report device 34 in order to check the well-being of the occupant. In cases in which no response is received from the occupant whose well-being is being checked, the vehicle controller device 20 notifies switchover information to the remote operation station 16 in order to switch over to remote driving. In cases in which the switchover information has been received by the remote operation station 16 and the operation-ready information has subsequently been received from the remote operation station 16, the vehicle controller device 20 performs remote driving. This enables the vehicle 12 to be switched to remote driving after checking occupant decision making ability. Specifically, in cases in which a response to the check-up information is received by a reception section of the vehicle 12, it is possible to confirm occupant decision making ability, namely that a switch to remote driving is not necessary. On the other hand, in cases in which a response is not received by the reception section, it is possible to confirm a lack of occupant decision making ability, namely that a switch to remote driving is necessary.

Moreover, in the present exemplary embodiment, after notifying the switchover information to switch to remote driving to the remote operation station 16, manual driving is switched to autonomous driving until a remote driver has been secured. The vehicle can thus be made to travel safely by switching to autonomous driving as an alternative in cases in which an immediate switch to remote driving cannot be performed when an abnormal state of an occupant has arisen.

Moreover, in the present exemplary embodiment, when the vehicle controller device 20 has determined that the compromised state has arisen, information relating to the compromised state is notified to the remote operation station 16. Audio information received from the remote operation station 16 in response to this notified information in order to check the well-being of the occupant is reported by being output using the report device 34. The remote driver operating the remote operation station 16 is thus able to check the well-being of the occupant, and is able to switch smoothly to remote driving. The remote driver is also able to prepare for remote driving at an early stage.

In the vehicle control system 10 of the present exemplary embodiment, the remote controller device 40 is provided to the remote operation station 16 operated by the remote driver. In cases in which information indicating that the vehicle occupant is in the compromised state has been received, the remote controller device 40 outputs information relating to the compromised state through the speaker 44. This enables a report to be made to the remote driver that the occupant is in the compromised state. The remote driver is able to swiftly respond to an emergency as a result.

Second Exemplary Embodiment

Figure 7:
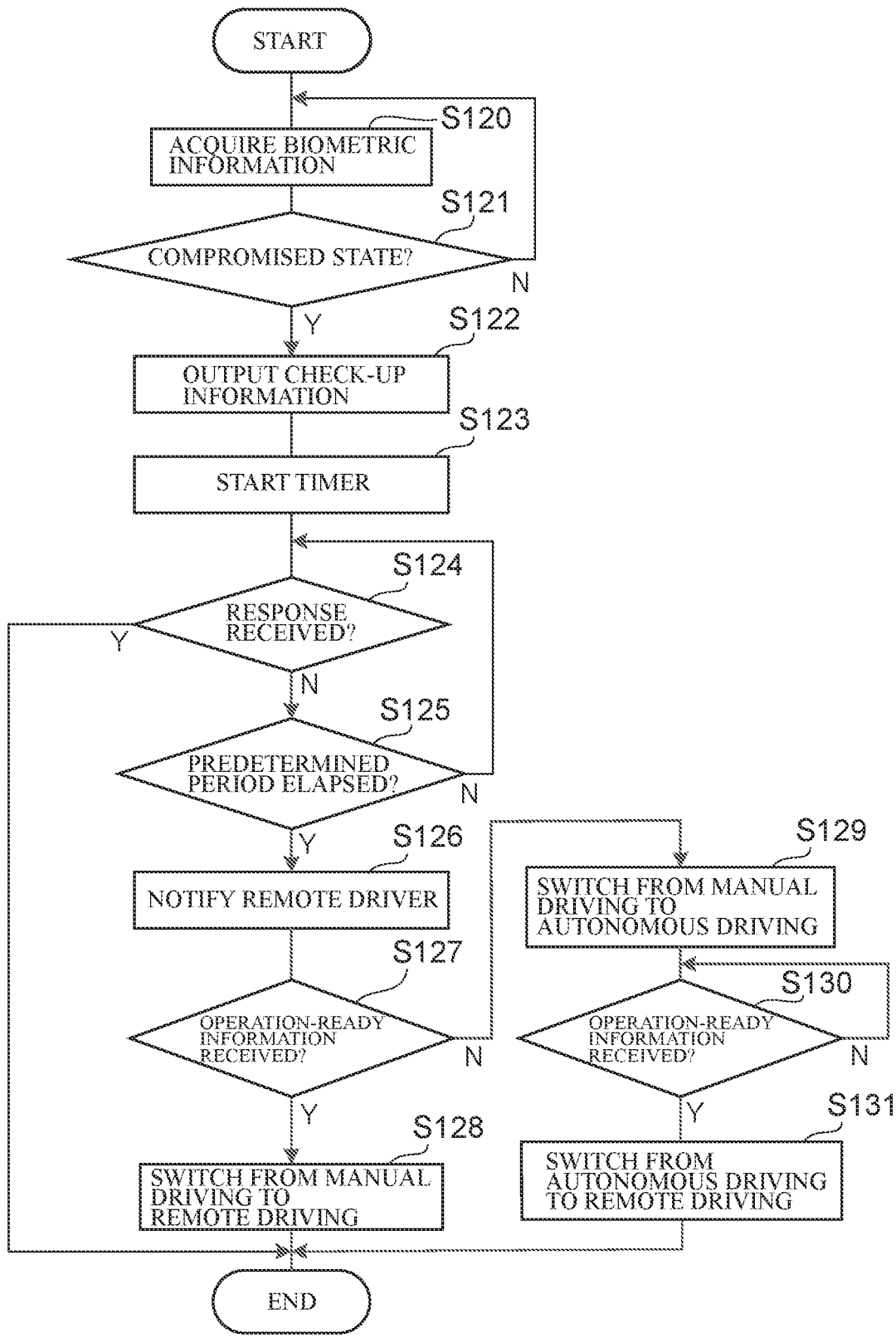
FIG. 7 is a flowchart explaining a flow of handover processing in a second exemplary embodiment.

Explanation follows regarding a second exemplary embodiment of the present disclosure, with reference to FIG. 7. Note that sections configured similarly to those in the first exemplary embodiment described above are allocated the same reference numerals, and explanation thereof is omitted.

The second exemplary embodiment differs from the first exemplary embodiment in the respect that occupant decision making ability is determined by the vehicle controller device 20 without being provided with check-up information from the remote operation station 16 in order to check the well-being of the occupant. Specifically, audio information serving as check-up information to check the well-being of the occupant is pre-stored in the storage 20D of the vehicle controller device 20. In cases in which the occupant has been determined to be in the compromised state, the vehicle controller device 20 outputs the check-up information using the report device 34. In cases in which the reception section 290 does not receive a response from the occupant, the notification section 300 notifies switchover information to the remote operation station 16.

In the second exemplary embodiment, the vehicle controller device 20 executes handover processing in which the vehicle 12 is switched to remote driving in cases in which the occupant is determined to be in the compromised state. The flow of the handover processing is explained below with reference to the flowchart in FIG. 7.

At step S120, the CPU 20A of the vehicle 12 that is being manually driven acquires the biometric information from the input devices 28 and the biometric sensors 32.

At step S121, the CPU 20A determines whether or not the occupant is in the compromised state. In cases in which the occupant is determined to be in the compromised state, processing proceeds to step S122. In cases in which the occupant is determined not to be in the compromised state, processing returns to step S120.

At step S122, the CPU 20A outputs check-up information through the speaker 34A of the vehicle 12 and thus starts a well-being check-up of the occupant inside the vehicle.

At step S123, the CPU 20A starts a timer to measure a predetermined determination period.

At step S124, the CPU 20A determines whether or not the occupant has responded to the check-up information output inside the vehicle. In cases in which a response is determined to have been made, the processing is ended. In cases in which a response is determined not to have been made, processing proceeds to step S125.

At step S125, the CPU 20A determines whether or not the predetermined determination period has elapsed. In cases in which the predetermined determination period is determined to have elapsed, processing proceeds to step S126. In cases in which the predetermined determination period is determined not to have elapsed, processing returns to step S124.

At step S126, the CPU 20A notifies to the remote operation station 16 switchover information for switching the vehicle 12 over to remote driving.

At step S127, the CPU 20A determines whether or not a remote driver has been secured to operate the remote operation station 16. Specifically, in cases in which operation-ready information has been received by the vehicle controller device 20, the CPU 20A determines that a remote driver has been secured. However, in cases in which operation-ready information has not been received, determination is made that a remote driver has not been secured. In cases in which determination is made that a remote driver has been secured, processing proceeds to step S128. In cases in which determination is made that a remote driver has not been secured, processing proceeds to step S129.

At step S128, the CPU 20A switches the vehicle 12 from manual driving to remote driving and ends the handover processing.

However, in cases in which the CPU 20A determines that a remote driver has not been secured and processing proceeds to step S129, the CPU 20A switches the vehicle 12 from manual driving to autonomous driving.

At step S130, the CPU 20A again determines whether or not a remote driver has been secured. In cases in which determination is made that a remote driver has been secured, processing proceeds to step S131. In cases in which determination is made that a remote driver has not been secured, the processing of step S130 is repeated.

At step S131, the CPU 20A switches the vehicle 12 from autonomous driving to remote driving, and ends the handover processing.

Operation and Advantageous Effects

In the handover processing of the present exemplary embodiment, the check-up information is automatically output through a report device provided inside the vehicle in order for the vehicle controller device 20 to determine whether the occupant is in the compromised state. In cases in which in a response is not received from the occupant within a predetermined period, a judgement is made that the check on occupant decision making ability has confirmed that a switch to remote driving is necessary, and switchover information is notified to the remote operation station 16 in order to switch the vehicle 12 to remote driving. Thus, occupant decision making ability, i.e. whether or not a switch to remote driving is necessary, can be judged by the vehicle controller device 20 alone. This enables the remote driver operating the remote operation station 16 to be relieved of the burden of making this judgement as a result.

Additional Explanation

Although in the exemplary embodiments described above the remote driver to whom the switchover information is notified takes over driving of the vehicle 12, namely, the remote operation station 16 acquires operation authority, there is no limitation thereto. The vehicle controller device 20 may be configured so as to confer operation authority to a remote driver when the occupant has been determined to be in the compromised state.

Although the exemplary embodiments described above employ examples in which a remote driver who manipulates the vehicle 12 as remote operation serves as a remote operator, there is no limitation thereto, and the remote operator may be an operator who gives instructions regarding the course, speed, and the like of the vehicle 12 as remote operation.

Although determination regarding the compromised state is executed by the vehicle controller device 20 in the handover processing of the second exemplary embodiment described above, this determination may be executed by an external information server connected to the vehicle 12 through the network N1.

Moreover, the threshold values for the biometric information employed in determination of the compromised state may be set individually according to personal data of each occupant stored in the storage 20D of the vehicle controller device 20, or in an external server. Such personal data may be formed by accumulating biometric information acquired during previous trips onboard the vehicle.

Note that in the exemplary embodiment described above, the occupant whose biometric information is detected is not limited to being the occupant of a driving seat, and may be the occupant of a front passenger seat or the occupant of a rear seat.

Note that the various processing executed by the CPU 20A reading software (a program), and the various processing executed by the CPU 40A reading software (a program) in the exemplary embodiments described above may be executed by various processors other than CPUs. Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The various processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiments described above describe a format in which the programs are stored (installed) in advance on a non-transient computer-readable recording medium. For example, the execution program employed by the vehicle controller device 20 of the autonomous driving-enabled vehicle 12 is stored in advance in the ROM 20B. The processing program employed by the remote controller device 40 of the remote operation station 16 is stored in advance in the ROM 40B. However, there is no limitation thereto, and the respective programs may be provided in a format recorded on a non-transient recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiments described above are given as examples, and unnecessary steps may be omitted, new steps added, and the processing sequence rearranged within a range not departing from the spirit thereof

What is claimed is:

1. A vehicle control system including a vehicle controller device and an operation device, wherein the vehicle controller device comprises:

a wireless communication interface that is configured to receive operation information to operate a vehicle, from the operation device disposed externally to the vehicle and operated by a remote operator;

a first memory; and a first processor that is connected to the first memory, the first processor being configured to:

acquire peripheral information regarding a periphery of the vehicle from a sensor, generate a travel plan for the vehicle based on the peripheral information, acquire biometric information of an occupant, based on the acquired biometric information, determine whether or not a compromised state has arisen in which manual driving by operation by the occupant is predicted to become compromised, in a case in which the compromised state is determined to have arisen, communicate check-up information, which is for checking a well-being of the occupant, using a display or speaker provided inside the vehicle, the check-up information being information transmitted from the operation device and input by the remote operator, receive a response from the occupant whose well-being is being checked, or notify the operation device of switchover information for switching the vehicle from the manual driving to remote driving in which the vehicle travels based on the operation information and switch from the manual driving to autonomous driving in a case in which a response from the occupant has not been received, and control the autonomous driving in which the vehicle travels based on the travel plan, control the remote driving in which the vehicle travels based on the operation information received from the operation device, and perform the remote driving in cases in which the switchover information has been received by the operation device; and wherein the operation device comprises a remote controller device including a second memory and a second processor connected to the second memory, the second processor being configured to:

in a case in which information relating to the compromised state has been received, a second speaker provided at the operation device reports information relating to the compromised state.

2. The vehicle controller device of claim 1, wherein the first processor is configured to switch from the manual driving to the autonomous driving after notifying the operation device of the switchover information and before receiving operation-ready information indicating that the remote driving is possible, and then, after the operation-ready information has been received from the operation device, switch from the autonomous driving to the remote driving.

3. The vehicle controller device of claim 1, wherein the first processor is further configured to:

notify the operation device of information relating to the compromised state, in a case in which the occupant has been determined to be in the compromised state; and communicate the check-up information, which is received from the operation device that has received the information relating to the compromised state, by outputting audio information.

4. The vehicle controller device of claim 1, wherein the first processor is configured to notify the switchover information to the operation device in a case in which a response has not been received from the occupant whose well-being has been checked within a predetermined period after the check-up information has been reported by the display or speaker.

* * * * *